United States Patent [19]

Morlec et al.

[11] Patent Number: 5,792,244
[45] Date of Patent: Aug. 11, 1998

[54] PACKING BLOCK WITH HIGH ADSORPTION CAPACITY FOR GASEOUS EFFLUENT PURIFICATION DEVICE

[75] Inventors: Jean Morlec; Jacques Bourcier, both of Saint-Nazaire, France

[73] Assignee: Institut Francais du Petrole, Rueil-Malmaison, France

[21] Appl. No.: 751,162

[22] Filed: Nov. 15, 1996

[30] Foreign Application Priority Data

Nov. 17, 1995 [FR] France ............. 95 13763

[51] Int. Cl.$^6$ ................................. B01D 53/04
[52] U.S. Cl. .................. 96/135; 96/153; 96/154; 55/521; 55/524; 55/527
[58] Field of Search .............. 55/521, 524, 527; 96/125, 126, 129, 130, 146, 153, 154, 135

[56] References Cited

U.S. PATENT DOCUMENTS

| | | | |
|---|---|---|---|
| 2,038,071 | 4/1936 | Wilhelm ............ | 96/153 X |
| 2,973,828 | 3/1961 | Engle ............ | 96/154 X |
| 3,664,095 | 5/1972 | Asker et al. ............ | 96/154 |
| 3,782,081 | 1/1974 | Munters ............ | 55/524 X |
| 3,800,515 | 4/1974 | Asker et al. ............ | 55/524 X |
| 3,925,021 | 12/1975 | Yoshino et al. ............ | 55/524 X |
| 4,038,059 | 7/1977 | Strindehag et al. ............ | 96/153 X |
| 4,255,171 | 3/1981 | Dravnieks ............ | 96/125 X |
| 4,289,513 | 9/1981 | Brownhill et al. ............ | 55/527 X |
| 4,484,938 | 11/1984 | Okamoto et al. ............ | 96/154 X |
| 4,769,053 | 9/1988 | Fischer, Jr. ............ | 96/125 |
| 4,900,340 | 2/1990 | Zuideveld et al. ............ | 96/126 X |
| 4,992,319 | 2/1991 | Kurosawa et al. ............ | 55/524 X |
| 5,032,156 | 7/1991 | Luder et al. ............ | 55/269 |
| 5,143,658 | 9/1992 | Thomas ............ | 261/112.2 |
| 5,194,414 | 3/1993 | Kuma ............ | 96/153 X |
| 5,348,922 | 9/1994 | Kuma ............ | 502/60 |
| 5,501,007 | 3/1996 | Kuma ............ | 96/153 X |
| 5,505,769 | 4/1996 | Dinnage et al. ............ | 96/154 X |
| 5,580,370 | 12/1996 | Kuma et al. ............ | 96/154 |

FOREIGN PATENT DOCUMENTS

| | | | |
|---|---|---|---|
| 0 367 717 | 5/1990 | European Pat. Off. . | |
| 0 628 346 | 12/1994 | European Pat. Off. . | |
| 1 362 274 | 4/1964 | France . | |
| 2120879 | 8/1972 | France . | |
| 2368295 | 6/1978 | France ............ | 96/154 |
| 12 53 673 | 11/1967 | Germany . | |
| 43 13 976 | 11/1993 | Germany . | |
| 48-005431 | 2/1973 | Japan ............ | 96/126 |
| 56-017622 | 2/1981 | Japan ............ | 96/125 |
| 56-031423 | 3/1981 | Japan ............ | 96/125 |
| 57-056019 | 4/1982 | Japan ............ | 96/153 |
| 63-319022 | 12/1988 | Japan ............ | 96/126 |
| 2-048015 | 2/1990 | Japan ............ | 96/154 |
| 5-137937 | 6/1993 | Japan ............ | 96/154 |
| 6007620 | 1/1994 | Japan ............ | 96/154 |
| 6-339611 | 12/1994 | Japan ............ | 96/154 |

*Primary Examiner*—Robert Spitzer
*Attorney, Agent, or Firm*—Antonelli, Terry, Stout & Kraus LLP

[57] ABSTRACT

The invention relates to a packing block made by alternately stacking thin corrugated plates (P1, P3) with a first elongation direction (X1), thin corrugated plates with a second elongation direction (X2) different from the first, and sheets (2) made of a material adsorbing the contaminants, interposed between the various thin plates in this stack. Such a block is used to pack the units of a purification device and is disposed in a stream of effluents containing contaminants such that the effluents pass through the channels delimited by the corrugations of the corrugated plates and the interposed sheets.

10 Claims, 2 Drawing Sheets

PACKING BLOCK WITH HIGH ADSORPTION CAPACITY FOR GASEOUS EFFLUENT PURIFICATION DEVICE

The present invention relates to a device with an adsorbent structure that can be placed in a gaseous effluent stream in order to retain contaminating substances that are mixed therein.

The process and device according to the invention can be applied in particular for purifying gaseous effluents containing volatile organic compounds, hereinafter called VOC, malodorous substances, or water. The generic term VOC includes hydrocarbons, chlorinated, fluorinated, and chlorofluorinated compounds, NOx compounds, SOx compounds, $H_2S$ compounds and mercaptans, $NH_3$ compounds and amines, and in general, all organic and inorganic compounds that may be present in troublesome concentrations in the air for various reasons.

Patent EN. 95/10591 by the applicants teaches a device for eliminating contaminants mixed with gaseous effluents. The effluents to be purified pass through a barrier comprising an array of purifying units side by side in an enclosure, each of which units contain adsorbing materials such as activated charcoal or zeolites. To restore the purifying ability to the purifying units, they are selectively and successively isolated by means of a movable collector when their adsorbent content is saturated, the time necessary for their desorption by heating and for transfer of the substances by an auxiliary fluid (a fraction of the effluents in the stream for example or a gas brought selectively to the inlet of the purifying unit to be desorbed by an auxiliary circuit), and possibly the substances mixed with the auxiliary fluid are transferred to a reactor designed to eliminate them.

Each purifying unit has for example several flat compartments disposed parallel or accordion-fashion between the front and rear faces of the purification barrier, with a space between them. Each of the compartments is delimited laterally by pieces of perforated sheet metal and is filled with an adsorbent material such as activated charcoal for example. Certain inlets and outlets on the front and rear faces are closed in order to lengthen the path of the effluents and thus increase their surface contact with the adsorbent. This deflection of flow can also be achieved by sheet metal baffles disposed slantwise between the various compartments or by disposing the compartments zigzag fashion such that the effluent is compelled to pass through them.

It is known that columns can be provided for heat or substance exchange between the fluids or for filtering, with multi-channel packings. These packings can be made on the basis of honeycomb structures or be made by stacking or juxtaposition of sheets or plates with a periodic structure (corrugations or differently shaped deformations) which delimit the channels in which the fluids circulate. Adsorbent materials can be placed in the channels of the packing to purify the fluids.

Packings for columns, possibly with adsorbing materials, are described for example in the following patents: EP-229,199 (U.S. Pat. No. 4,675,103), U.S. Pat. No. 4,532,086, EP-117,949 (U.S. Pat. No. 4,541,967), U.S. Pat. No. 4,744,928, EP-640,385, U.S. Pat. No. 4,672,536 or U.S. Pat. No. 4,830,792.

In the remainder of the text, the expression "corrugated plate" will be used to designate in general any plate provided with periodic lengthwise deformations that are parallel to each other (with a common elongation direction).

The packing block according to the invention is designed to adsorb contaminating substances mixed into a stream of gaseous effluents. It has at least one block made by stacking thin corrugated plates with a first elongation direction alternately with thin corrugated plates with a second elongation direction, different from the first. The corrugations delimit two nonparallel channel networks.

It is characterized in that the two networks communicate with each other through sheets made of a material adsorbing the contaminants, interposed between the various thin plates in this stack, the block being disposed in a stream of effluents such that the effluents pass through it at depth, circulating randomly between the two channel networks and remaining in contact with the adsorbent sheets.

According to one embodiment facilitating periodic desorption of the block by countercurrent thermal action of the streams to be decontaminated, the thin corrugated plates are made from a material capable of reflecting infrared rays and the adsorbent material is chosen for its considerable ability to adsorb infrared rays.

The thin corrugated plates can be made from inorganic or organic materials. As the case may be, the thin corrugated plates may be made from smooth metal or metal with discontinuities or roughnesses: perforated, stamped, and crimped metal sheets, sheet metal, etc. in order to create turbulence favoring contact between the effluents and the sheets of adsorbent material.

The adsorbent sheets can be made of one or more layers of activated charcoal cloth or fiberglass cloth coated with an adsorbent substance such as hydrophilic or water-repellent zeolites, as the case may be, or nonwovens such as felts for example.

With a packing block designed in this manner, the effluents pass through the packing block following the channel delimited by the folds in the plates and remain in intimate contact with the adsorbent sheets. The desorption obtained is very effective without a high pressure loss resulting thereby.

Other characteristics and advantages of the packing block according to the invention will emerge from reading the description hereinbelow of embodiments described as nonlimiting examples with reference to the attached drawings wherein.

Figure 2:
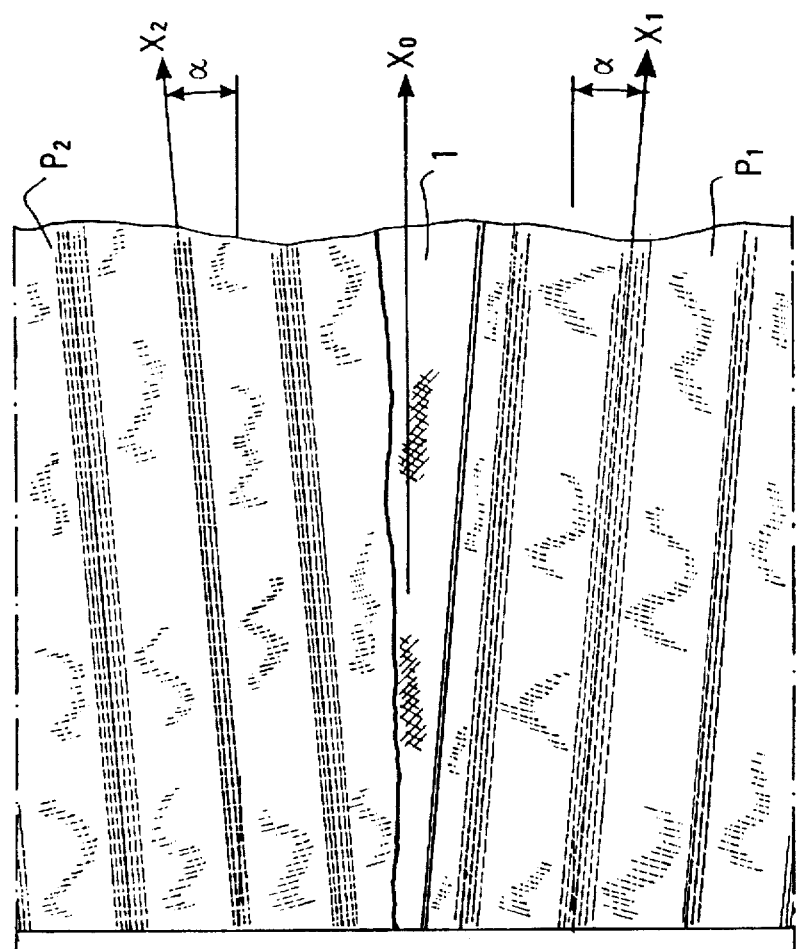
FIG. 2 is a top view of superimposed corrugated plates with symmetrical elongation directions relative to an axis X0 on either side of an adsorbent sheet.
Figure 1:
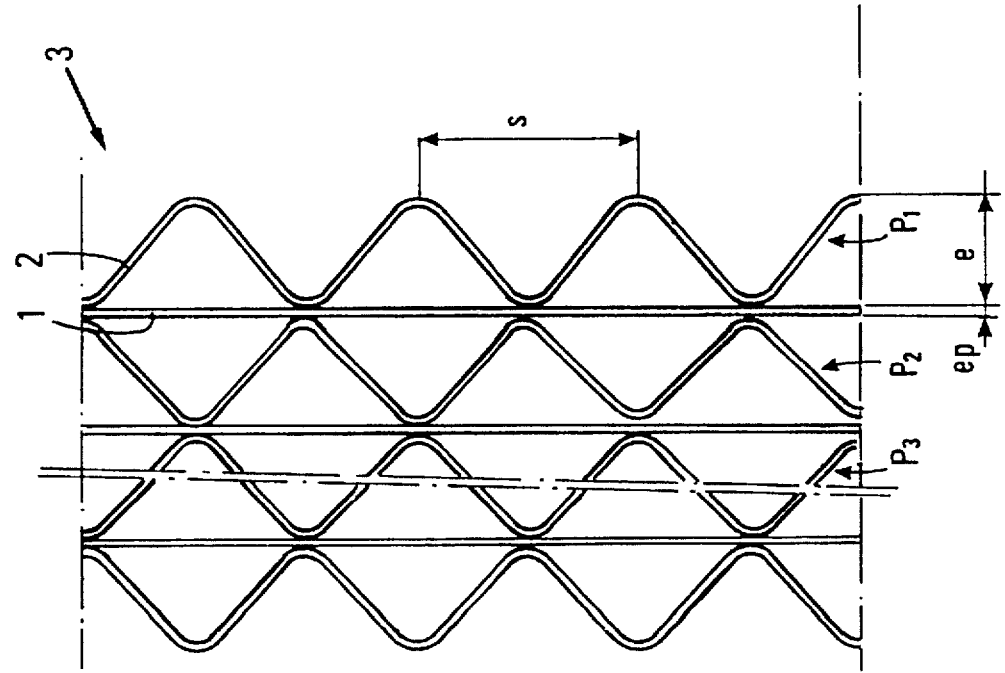
FIG. 1 shows schematically, in cross section, a stack of corrugated plates and adsorbent sheets.

As shown in FIGS. 1 and 2, the block is made by stacking thin plates P1, P2, P3, P4, etc. provided with periodic lengthwise deformations parallel with each other such as corrugations. For a first set of corrugated plates (odd plates P1, P3, etc. for example) the elongation direction of the corrugations is X1. The elongation direction X2 of the corrugations of the complementary set of plates (even plates P2, P4, etc.) makes an angle $2\alpha$ with direction X1. The angle $\alpha$ can vary for example between 5° and 45° for example. The inclination of the successive plates in the stack relative to each other has the effect that they are in contact by their tops or edges without risk of fitting into each other.

Sheets 1 made from a material chosen to adsorb the contaminants in the effluents to be treated, or from a substrate on which an adsorbent surface is mounted, are interposed between all the plates (P1, P2,), (P2, P3), (P3, P4) etc. Each sheet 1 delimits, with each of the adjacent corrugations, a triangular passageway 2. These adsorbent sheets are preferably made of materials able to withstand high temperatures (several hundreds of °C.) necessary for their thermal desorption.

A block or packing 3 is made from such a stack of corrugated plates P with interposition of adsorbing sheets 1 (FIG. 2) and can be used for example in the purifying units of the device in the aforementioned patent application EN 95/10591. Block 3 is positioned for example such that the directions X1, X2 of the channels on either side of adsorbent sheets 1 are symmetrical with each other relative to the main direction X0 of a stream of effluents to be purified. With this arrangement, the length of the paths traversed by the effluents along passageways 2 is increased.

Adsorbent sheets 1 can for example be activated charcoal cloth and be in one or more layers, or be fiberglass cloth coated with water-repellent zeolites. They can also be made on the basis of felt or any other nonwoven material that adsorbs throughout its mass, or by its coating.

The thin corrugated plates P are metal or polymer sheets able to withstand the temperatures necessary for periodic desorption of the adsorbent. These plates can be smooth, but preferably have irregularities of relief, roughnesses, or discontinuities in order to in particular to create turbulent flow of the effluents along passageways 2 and improve their contact with sheets 1 resulting in better absorption of the contaminants. This effect is obtained with plates having a fine distribution of holes, embossed and stamped plates, or plates made of a folded cloth.

Figure 3:
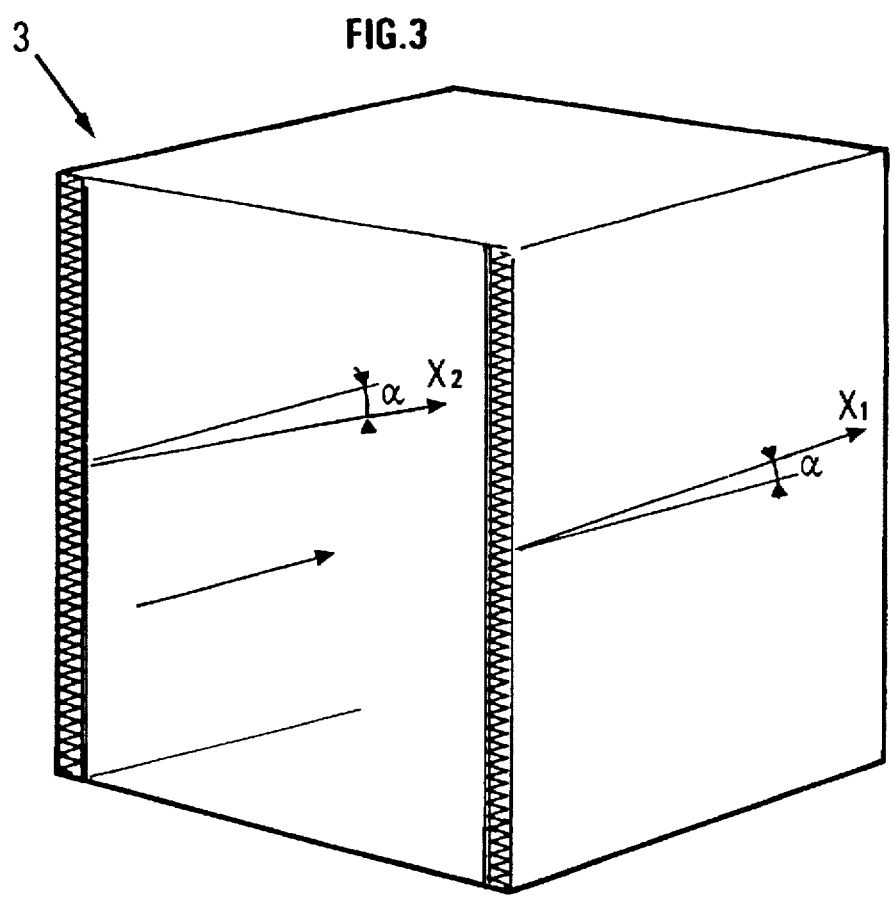
FIG. 3 shows schematically a packing block made by stacking plates and adsorbent sheets.

Blocks can be made (FIG. 3) with adsorbent sheets of activated charcoal cloth with a thickness th disposed between corrugated or folded plates with a pitch s, and fold thicknesses t between the folds, in the following dimensions:

$$2 \leq e \leq 6 \text{ mm}$$
$$10 \leq s \leq 20 \text{ mm}$$
$$0.5 \leq ep \leq 3 \text{ mm}$$

and in this way make blocks in which the mass of activated charcoal cloth is between 50 and 150 kg per m³ for example.

If plates P made of a material that reflects infrared waves and sheets 1 made of a substance well able to adsorb these waves (as is the case for activated charcoal cloth for example) are used, so-called countercurrent thermal desorption can be carried out. Downstream of each purification block, as described in the aforesaid patent application, is a reactor emitting infrared waves which propagate well in the upstream direction along the various passageways 2 without being impeded by the streams of effluents moving in the reverse direction.

A packing block has been described in an application to purification of gaseous effluents. It would not however be a departure from the invention to use it in another application. Such a block might serve for example also for dehumidifying air in applications to agricultural industries: drying grains, etc., in which case the adsorbent sheets are made for example on the basis of hydrophilic zeolites or any other substance able to adsorb water, particularly alumina.

We claim:

1. Packing block for a purification device designed to adsorb contaminating substances mixed into a stream of gaseous effluents comprising a stack, made by alternately stacking thin corrugated plates with a first elongation direction (X1) and thin corrugated plates with a second elongation direction (X2) different from the first, with the corrugations delimiting two nonparallel channel networks, characterized in that the two networks communicate with each other through sheets made of a material adsorbing the contaminants, said sheets being interposed between the various thin plates in this stack, the block being disposed in a stream of effluents such that the effluents pass through it at depth, circulating randomly between the two channel networks and remaining in contact with the adsorbent sheets.

2. Packing block according to claim 1, characterized in that the thin corrugated plates are made from a material capable of reflecting infrared rays and the adsorbent material of the sheets is chosen to adsorb infrared rays.

3. Packing block according to claim 1, characterized in that the material adsorbing contaminants of the sheets comprises at least one layer of an activated charcoal cloth.

4. Packing block according to claim 1, characterized in that the sheets have at least one layer of a fiberglass cloth coated with hydrophobic zeolites.

5. Packing block according to claim 1, characterized in that the sheets have at least one layer of a fiberglass cloth coated with hydrophilic zeolites.

6. Packing block according to claim 1, characterized in that the thin corrugated plates are made from cloth.

7. Packing block according to claim 1, characterized in that the sheets have at least one layer of a nonwoven substance.

8. Packing block according to claim 7, wherein said nonwoven substance is felt.

9. Packing block according to claim 1, characterized in that the thin corrugated plates have roughnesses or discontinuities.

10. Packing block according to claim 9, characterized in that the thin corrugated plates have a hole distribution obtained by drilling, embossing, or stamping.

* * * * *